Figure 1:
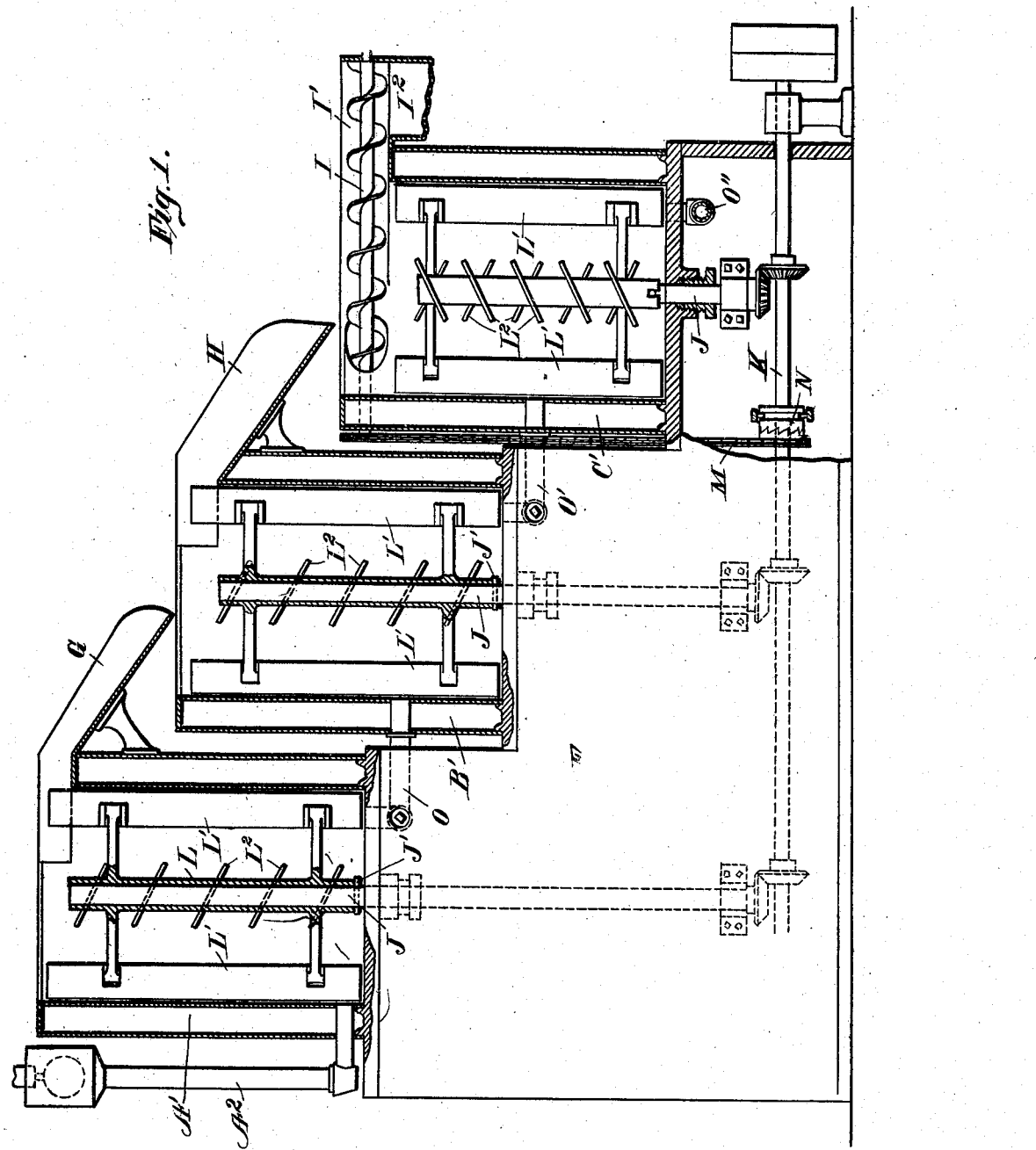
Figure 2:
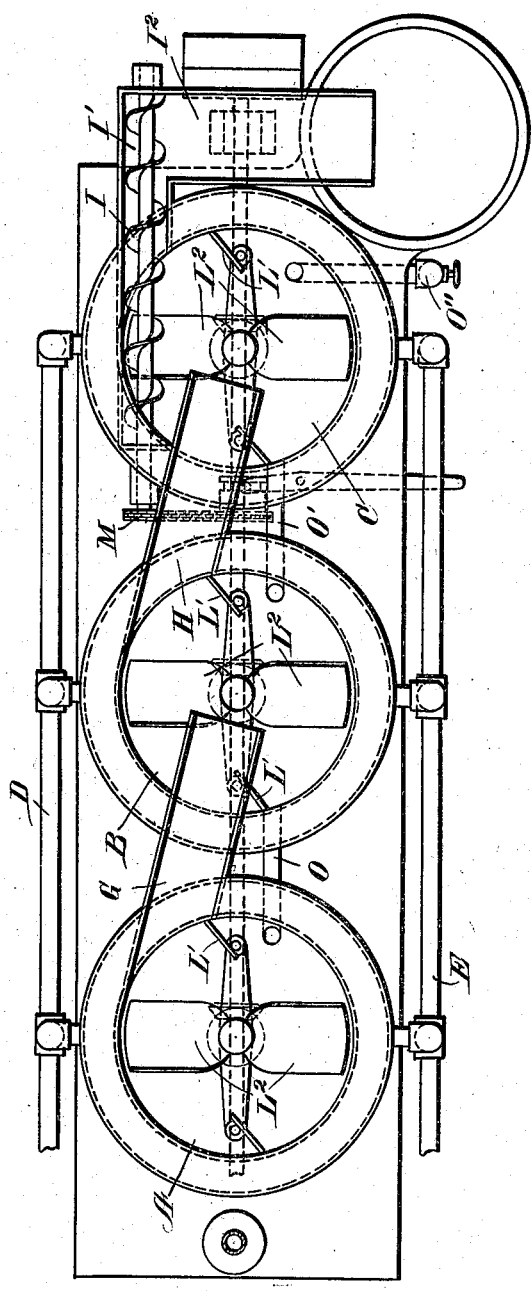

T. L. VALERIUS.
ICE CREAM FREEZER.
APPLICATION FILED JULY 28, 1906.

899,926.

Patented Sept. 29, 1908.
2 SHEETS—SHEET 2.

Witnesses:
H. S. Austin
K. M. Imboden

Inventor
Theodore L. Valerius,
By
Attorney

UNITED STATES PATENT OFFICE.

THEODORE L. VALERIUS, OF FORT ATKINSON, WISCONSIN, ASSIGNOR TO THE CREAMERY PACKAGE MFG. COMPANY, OF CHICAGO, ILLINOIS, A CORPORATION OF ILLINOIS.

ICE-CREAM FREEZER.

No. 899,926.

Specification of Letters Patent.

Patented Sept. 29, 1908.

Application filed July 28, 1906. Serial No. 328,225.

*To all whom it may concern:*

Be it known that I, THEODORE L. VALERIUS, a citizen of Fort Atkinson, county of Jefferson, and State of Wisconsin, have invented a certain new, useful, and Improved Ice-Cream Freezer, of which the following is a full, clear, and exact description, such as will enable others skilled in the art to which it appertains to make and use the same.

My invention relates to the art of manufacturing ice cream and the like, and has special reference to improvements in ice cream freezers.

The primary object of my invention is to provide an improved apparatus whereby a constantly flowing stream of "custard" may be converted into ice cream, and continuously delivered to packing vessels or molds.

With this end in view, my invention consists, broadly, in an ice cream freezer comprising an externally cooled freezing can, having its top formed to discharge semi-frozen liquid therefrom, in combination with a rotary dasher provided in said can, and means for continuously feeding custard to said can. And further, my invention consists in a plurality of ice cream freezers of the above description, arranged in series, whereby the process of freezing, begun in one thereof, is completed in another.

My invention also consists in various details of construction and in combinations of parts, all as hereinafter described, and particularly pointed out in the claims.

My invention will be more readily understood by reference to the accompanying drawings forming a part of this specification, and in which Figure I is a vertical section of an ice cream freezer embodying my invention, and Fig. II is a plan view thereof.

Referring to the drawings, A, B, and C represent the freezing cans. A and B are substantially identical in form. C differs from the others in the particulars hereinafter explained.

The freezing cans are provided with jackets A', B', C', respectively, and these jackets or spaces are kept full of freezing fluid, such as brine, circulated through pipes D and E, connected with a brine tank and pump (not shown).

A² represents the custard inlet or supply connection of the freezer A. This is preferably arranged to supply the custard to the bottom of the freezer can, but, if desired, the arrangement may be such as to discharge the custard into the open top of the freezing can. The cans rest upon a frame F, having as many steps as there are cans, and the frozen liquid from the upper can is discharged into the top of the intermediate can, and thence into the top of the last can of the series.

G represents the tangential discharge spout of the upper freezing can, H a similar tangential spout on the intermediate can, and I the discharge device of the lower can. The discharge device, comprises a trough I', provided with an inclined spout I² and a worm or screw conveyer I. The latter is constructed to convey the frozen cream from the top of the can to the spout I².

Each can is provided with a central dasher-driving shaft J, which extends through a stuffing box in the bottom of said can. All of these shafts are driven from a single power shaft K, arranged in the lower part of the frame F, beveled gears being employed as shown. The dashers are mounted upon respective shafts J, and those belonging to the cans A and B are identical. The freezing can C, being of the same height, its dasher is of less height, to admit the conveyer I. Each dasher comprises a central tube or sleeve L, two pivoted scrapers L', and a large number of inclined blades, L², borne by said sleeve. The dasher is connected with the shaft J by a suitable clutch at its lower end, preferably a pin J' in the shaft, fitted to a notch or recess in the lower end of the sleeve L.

The conveyer I is driven from the shaft K by means of a belt M and suitable pulleys, connected with the shaft by a clutch N on the latter. By throwing out the clutch, the discharge of cream from the lower can may be interrupted.

O, O' represent by-pass ducts for drawing off the contents of the freezers A and B when it is desired to empty them. The can C has a like drain cock, O''.

The operation of my novel ice cream freezer is as follows: The dashers having been set in operation, and the flow of brine through the jackets having been established, the freezer is ready for use. A supply of custard is then admitted to the upper can through the inlet A². On entering the can, the custard is agitated by the rotating dasher, and being forced into contact with the chilled walls of the can, is partially frozen. The tendency of the frozen cream is to rise to the top; hence, by the time the can has been partially filled with custard, the partially frozen cream will begin to discharge from the top of the can through the spout G. This partially frozen liquid, falling into the second freezer, is subjected to further refrigeration and agitation, and upon leaving the top of the second freezer is subjected to the final action of the third freezer. As the frozen cream rises to the top of the last freezing can or vessel, it is gently conveyed therefrom by the rotating conveyer I, previously started into motion by the throwing of the clutch N. The finished ice cream slides down or through the chute or spout I², into a packing vessel or mold placed to receive it.

The entire operation of the apparatus is at all times within the view of the operator, who, by controlling the flow of custard to the uppermost can, and the discharge of cream from the lowermost can, may insure the uniform production of ice cream of the best quality.

It is obvious that the process of continuously freezing or manufacturing ice cream may be conducted in a single freezing can of the foregoing description, but in such cases, the capacity of the freezer will be less, as the entire process must be carried out in a single freezer. Where a single can is thus employed, I prefer to utilize the rotary conveyer I as the means for discharging the semi-frozen liquid, the effect of such conveyer being to discharge the cream without deflating it, and in the best possible condition for storage or immediate sale.

It is obvious that various modifications of my invention will readily suggest themselves to one skilled in the art, and I therefore do not confine the invention to the specific structure herein shown and described.

Having thus described my invention, I claim as new, and desire to secure by Letters Patent

1. In an ice cream freezer, an upright externally cooled stationary freezing can open at the top and having a discharge opening in its upper edge, in combination with means for supplying liquid to said can, a dasher within said can and means for rotating said dasher, substantially as described.

2. In an ice cream freezer, an externally cooled upright cylindrical can to contain the liquid to be frozen and open at the top for the discharge of frozen liquid, in combination with means for continuously supplying liquid thereto, a dasher having a suitable scraper and revoluble in said can, and means at the top of the can for carrying off the semi frozen liquid, substantially as described.

3. In an ice cream freezer, an externally cooled upright freezing can, having a spout extending from its upper edge for the discharge of frozen liquid, in combination with means for supplying liquid to said can, and a suitable dasher revoluble in said can, substantially as described.

4. In an ice cream freezer, an upright non-rotative cylindrical can, in combination with a discharge spout leading from the upper edge of the can, means for refrigerating and agitating the contents of said can, and a liquid supply spout, substantially as described.

5. In an ice cream freezer, an upright non-rotative cylindrical can, open at the top, in combination with means for chilling the walls of said can, a rotary dasher provided in said can, means for continuously supplying liquid to be frozen, and driven mechanism for continuously removing the frozen liquid from the top of said can, substantially as described.

6. In an ice cream freezer, an upright cylindrical freezing can, open at the top, in combination with means for chilling the contents of said can, a suitable dasher in said can, means for feeding liquid to said can and means transversely operable in the top of said can for withdrawing and discharging frozen liquid therefrom, substantially as described.

7. In an ice cream freezer, an upright cylindrical freezing can, open at the top, in combination with means for chilling the contents of said can, a suitable dasher in said can, means for feeding liquid to said can and a rotary conveyer transversely operable in the upper part of said can for withdrawing and discharging frozen liquid therefrom, substantially as described.

8. In an ice cream freezer, an upright cylindrical freezing can open at the top, in combination with means for chilling the contents of said can, a suitable dasher in said can, means for feeding liquid to said can, and a rotary screw conveyer transversely operable in the upper part of said can for discharging frozen liquid therefrom, substantially as described.

9. In an ice cream freezer, an upright cylindrical can to contain the liquid to be frozen, in combination with means for chilling the walls of said can, a dasher arranged for rotation within said can, means for rotating said dasher, means for supplying liquid to said can, a frozen-liquid discharging device in the upper part of said can, and means for rotating said device, substantially as described.

10. In an ice cream freezer, an upright cylindrical can to contain the liquid to be frozen, in combination with means for chilling the walls of said can, a dasher operable within said can, means for continuously supplying liquid to said can, and means for removing the frozen liquid transversely from the upper part of said can, substantially as described.

11. In an ice cream freezer, a plurality of non-rotative cans, open at the top and arranged at different heights, in combination with means for chilling the walls of said cans, dashers revoluble in said cans, and means at the top of each can for discharging frozen liquid therefrom into the next can, as and for the purpose specified.

12. In an ice cream freezer, a plurality of non-rotative cylindrical cans open at the top and arranged at different heights, in combination with means for chilling the walls of said cans, dashers revoluble in said cans, means for supplying custard to the upper can, a down-spout leading from the top of the upper can to the top of a lower can, and means for discharging frozen liquid from the top of said lower can, substantially as described.

13. In an ice cream freezer, a plurality of externally cooled freezing cans, open at the top and arranged at different heights, in combination with dashers provided in said cans, means for supplying liquid to the upper can, means for transferring partially frozen liquid from said upper can to the lower can, and means for discharging frozen liquid from the top of said lower can, substantially as described.

14. In an ice cream freezer, a plurality of externally cooled freezing cans open at the top and arranged at different heights, in combination with suitably driven shafts, extending through the bottoms of said cans, suitable dashers on said shafts, means for continuously supplying liquid to the upper can, and inclined spouts leading from the tops of said cans, whereby the partially frozen liquid is transferred from one can to the next in the series, substantially as described.

15. In an ice cream freezer, a non-rotative, upright externally cooled, cylindrical can which is open at the top, in combination with a dasher operable in said can, a transverse trough or duct leading from the upper edge of said can, a screw conveyer provided therein above said dasher, and means for rotating said dasher and said conveyer, substantially as described.

16. In an ice cream freezer, a plurality of upright freezing cans, each provided with a tangentially arranged discharge spout at its top, in combination with means for continuously supplying liquid to the upper can, and means for chilling and agitating the contents of said cans, substantially as described.

17. In an ice cream freezer, an upright freezing can open at the top, in combination with a rotary dasher in said can, means for feeding the liquid to be frozen to said can, a screw conveyer transversely arranged above said dasher, and an inclined delivery spout whereto said conveyer delivers the frozen liquid, substantially as described.

18. In an ice cream freezer, a plurality of externally cooled non-rotative freezing cans arranged at different heights and open at the top, in combination with dashers in said cans, means for supplying liquid to the upper can, means for transferring partially frozen liquid from the top of said upper can to the next can, the lowermost can having a discharge opening at the top and discharging mechanism operating in the upper part and the discharge opening of the lowermost can, said mechanism adapted to withdraw the frozen liquid transversely from said lowermost can, substantially as described.

19. In an ice cream freezer, an open freezing can and suitable means for chilling the contents of the can in combination with agitating and scraping means within and revoluble upon the vertical axis of the can, a discharge opening at the top of the can, a trough leading from said opening, a rotary conveyer partly in said trough and partly in the upper part of said can and adapted to gently withdraw, and discharge, partially frozen cream from the top of the can, substantially as described.

In testimony whereof, I have hereunto set my hand, this 25th day of July, 1906, in the presence of two subscribing witnesses.

THEODORE L. VALERIUS.

Witnesses:
 IRVING R. HIPPENMEYER,
 SANFORD P. STARKS.